United States Patent
Fernandez et al.

(10) Patent No.: US 11,581,584 B2
(45) Date of Patent: Feb. 14, 2023

(54) DATA TRANSMISSION TECHNIQUES ASSOCIATED WITH A BATTERY PACK

(71) Applicant: Commissariat à l'Énergie Atomique et aux Énergies Alternatives, Paris (FR)

(72) Inventors: Eric Fernandez, Saint Paul de Varces (FR); Sylvain Bacquet, Chasselay (FR); Léandro Cassarino, Talence (FR); Ghislain Despesse, Voreppe (FR); Yan Lopez, Renage (FR); Rémy Thomas, Echirolles (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 302 days.

(21) Appl. No.: 16/958,124

(22) PCT Filed: Dec. 24, 2018

(86) PCT No.: PCT/FR2018/053542
§ 371 (c)(1),
(2) Date: Jun. 25, 2020

(87) PCT Pub. No.: WO2019/129990
PCT Pub. Date: Jul. 4, 2019

(65) Prior Publication Data
US 2020/0365949 A1    Nov. 19, 2020

(30) Foreign Application Priority Data
Dec. 27, 2017  (FR) ...................................... 1763250

(51) Int. Cl.
*H01M 10/46* (2006.01)
*H01M 10/42* (2006.01)
*H02J 7/00* (2006.01)

(52) U.S. Cl.
CPC ......... *H01M 10/425* (2013.01); *H02J 7/0024* (2013.01); *H01M 2010/4271* (2013.01); *H01M 2010/4278* (2013.01)

(58) Field of Classification Search
CPC ...... H02J 7/0024; H02J 7/0025; H02J 7/0013; H02J 7/00032; H01M 10/425; H01M 2010/4271; H01M 2010/4278
(Continued)

(56) References Cited

U.S. PATENT DOCUMENTS

2018/0099579 A1* 4/2018 Hale ..................... H02J 7/0025
2020/0335986 A1* 10/2020 Despesse ............ H02J 7/00032

FOREIGN PATENT DOCUMENTS

| FR | 2 947 112 A1 | 12/2010 |
| GB | 2 537 616 A | 10/2016 |
| WO | WO 2012/030455 A2 | 3/2012 |

OTHER PUBLICATIONS

International Search Report and Written Opinion for International Application No. PCT/FR2018/053542, dated Mar. 6, 2019.
(Continued)

*Primary Examiner* — Edward Tso
(74) *Attorney, Agent, or Firm* — Wolf, Greenfield & Sacks, P.C.

(57) ABSTRACT

A battery including a first control circuit and a plurality of modules arranged in series between first and second terminals, each module including electric cells and switches coupling the cells to third and fourth terminals and a second switch control circuit. The battery includes a first data transmission bus coupling the first control circuit to each second control circuit and a second data transmission bus coupling the first control circuit to each second control circuit. The first control circuit is capable of transmitting first data to the second control circuits over the first bus at
(Continued)

a first rate and is capable of transmitting second data to the second control circuits over the second bus at a second rate smaller than the first rate.

10 Claims, 2 Drawing Sheets

(58) Field of Classification Search
USPC .................. 320/107, 116, 117, 118, 132, 148
See application file for complete search history.

(56) References Cited

OTHER PUBLICATIONS

International Preliminary Report on Patentability for International Application No. PCT/FR2018/053542, dated Jul. 9, 2020.

* cited by examiner

DATA TRANSMISSION TECHNIQUES ASSOCIATED WITH A BATTERY PACK This application is a national stage filing under 35 U.S.C. § 371 of International Patent Application Serial No. PCT/FR2018/053542, filed Dec. 24, 2018, which claims priority to French patent application FR17/63250, filed Dec. 27, 2017. The contents of these applications are incorporated herein by reference in their entireties.

BACKGROUND

The present invention concerns a battery of electric cells or accumulators, also called pack battery.

DISCUSSION OF THE RELATED ART

There exists to form a battery comprising a plurality of stages or modules in each of which accumulators, also called cells, may be connected in series or in parallel by controllable switches. Such a battery is capable of delivering a voltage having its waveform varying over time by varying the cell connection over time via the turning on or the turning off of the switches.

FIG. 1 shows an example of such a battery 5. Battery 5 comprises N modules $E_1$ to $E_N$. Number N is an integer that may be in the range from 1 to 50. Each module comprises a positive terminal B+ and a negative terminal B− and a plurality of cells, not shown, capable of being connected to one another in series and/or in parallel via switches, not shown, between terminals B+ and B−. Modules $E_1$ to $E_N$ may be series-connected between a first terminal Neutral of battery 5 and a second terminal Phase of battery 5. An example of such a battery is described in patent application WO 2012/117110.

Battery 5 comprises a circuit BMS for controlling modules $E_1$ to $E_N$, called master control circuit hereafter. Master control circuit BMS may exchange data with each module $E_1$ to $E_N$ via a bidirectional data transmission BUS. Each module $E_1$ to $E_N$ comprises a circuit, not shown, for controlling the module switches, called slave control circuit hereafter, based on control signals supplied by master control circuit BMS. Each module further comprises sensors, not shown, for example, sensors of the voltage across each cell of the module, sensors of the current delivered by each cell of the module, and/or sensors of the temperature of each cell of the module. The slave control circuit of each module $E_1$ to $E_N$ is capable of transmitting to master control circuit BMS data representative of the measurements of voltages, currents, and/or temperatures over data transmission bus Bus.

Master control circuit BMS is capable of receiving a set point value C, for example, a set point value for the voltage and/or the current and/or the connection of a given number of electric cells between the Phase and Neutral terminals, and of selecting the cells to be connected or disconnected for each module to obtain the desired voltage and/or current between terminals Phase and Neutral of battery 5. Master control circuit BMS then delivers control signals to the modules over the data transmission bus, based on which the slave control signal of each module connects or disconnects the cells according to the desired configuration.

It is desirable for the selection of the cells to be connected/disconnected to be performed by ensuring that each cell operates in its optimal operating range according to the voltage, current, and temperature measurements supplied by the modules. In particular, it is desirable for master control circuit BMS to perform a balancing of the cells, that is, for the cell selection to be performed so that the differences between the states of charge of the cells to permanently be as small as possible. It is further desirable for the cell selection to take into account a possible failure of a cell so as to, for example, exclude this cell from the selection.

To perform the balancing function, master control circuit BMS may determine a classification of the cells according to a priority level, the cells holding the highest priority in the classification being those which should be selected first. The priority classification, also called priority table, is capable of evolving during the battery operation, particularly due to the variation of the states of charge of the cells or due to the failure of a cell.

Master control circuit BMS may take into account the priority classification during the determination of the cell connection/disconnection control signals and may in particular take into account the evolution of the priority classification over time. As a variation, the master control circuit may transmit to the slave control circuits data representative of the priority table and the slave control circuits, based on the control signals delivered by the master control circuit, determine the cells to be selected, taking the priority table into account.

For certain applications, the set point value received by master control circuit BMS may vary rapidly so that it may be difficult to take into account a modification of the priority classification without disturbing the transmission of the control signals from master control circuit BMS to the slave control circuits to follow the set point value. Further, it may then be difficult to ensure the transmission of data other than the control signals between the slave control circuits and master control circuit BMS without disturbing the transmission of the control signals from master control circuit BMS to the slave control circuits to follow the set point value.

SUMMARY

Thus, an object of an embodiment is to provide a battery which overcomes at least some of the disadvantages of the previously-described batteries.

Another object of an embodiment is for the transmission of the control signals from the master control circuit of the battery to the slave control circuits of the modules in order to follow the set point value not to be disturbed by the modification of the priority classification.

Another object of an embodiment is for the transmission of the control signals from the master control circuit of the battery to the slave control circuits of the modules in order to follow the set point not to be disturbed by the transmission of data other than the control signals between the slave control circuits and master control circuit BMS.

Thus, an embodiment provides a battery comprising a first control circuit and a plurality of modules arranged in series between first and second terminals, each module comprising third and fourth terminals, at least one of the third and fourth terminals of each module being coupled to one of the third and fourth terminals of another module, each module comprising electric cells and switches coupling the cells together and to the third and fourth terminals of the module and a second circuit for controlling the switches, the battery further comprising a first data transmission bus coupling the first control circuit to each second control circuit and a second data transmission bus coupling the first control circuit to each second control circuit. The first control circuit is capable of transmitting first data to the second control circuits over the first bus at a first rate and is capable of transmitting second data to the second control circuits over the second bus at a second rate smaller than the first rate.

According to an embodiment, the first control circuit is capable of transmitting the first data to the second control circuits over the first bus at the first rate which varies from 5 megabits per second to 7 megabits per second.

According to an embodiment, the first control circuit is capable of transmitting the second data to the second control circuits over the second bus at the second rate which varies from 0.5 megabit per second to 1 megabit per second.

According to an embodiment, the first bus is unidirectional.

According to an embodiment, the second bus is bidirectional.

According to an embodiment, each second control circuit is capable of transmitting third data to the first control circuit over the second bus.

According to an embodiment, each module comprises at least one sensor coupled to the second control circuit.

An embodiment provides using a battery such as previously defined, wherein the first control circuit receives a set point value for the delivery of a voltage and/or of a current and/or for the connection of a given number of electric cells between the first and second terminals and determines the first data based on the set point value, the second control circuit of each module receiving the first data and controlling the turning on or the turning off of the switches of the module based on the first data.

According to an embodiment, the first control circuit determines a table of priority of connection of the electric cells of the modules, the second transmitted data being representative of the priority table.

According to an embodiment, the connection priority table is determined by the first control circuit based on the third data.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. For the sake of clarity, only the elements that are useful for an understanding of the embodiments described herein have been illustrated and described in detail. In particular, the conventional functions carried out by a master control circuit of a cell battery such as the cell balancing are well known by those skilled in the art and are not described in further detail hereafter. In the following description, the expressions "substantially", "about", "approximately", and "in the order of" mean "within 10%", preferably within 5%.

An embodiment of a method of controlling systems with switched cells will be described in the case of a switched accumulator battery for which the cells correspond to switched accumulators. However, the present embodiments apply to any type of system with switched cells capable of supplying a variable voltage to a load. Each cell of the system with switched cells may correspond to an electric charge storage element or to an electric generator. An example of an electric charge storage element for example is an electric accumulator or a capacitor. An example of an electric generator is for example a fuel cell, a zinc-air cell, a photovoltaic cell, or a power recovery system, particularly a small wind power plant or a mini-turbine. The system which switched cells may comprise electric charge storage elements only, electric generators only, or both electric charge storage elements and electric generators. When the system with switched cells comprises electric generators only, the use is theoretically in discharge mode only. However, in case of a reactive power, for brief passages through a negative power at each period, the inertia of the generator may be sufficient to smooth the power, for example, due to the rotation inertia and to the stray capacitances. Further, each generator may be connected in parallel to a resistive element, to accept negative powers, by dissipating this power. In operation, the system is intended to be coupled to a device which absorbs or supplies power according to the envisaged application. As an example, this device corresponds to an electric machine, for example, to an electric motor, or to the electric distribution network.

Figure 1:
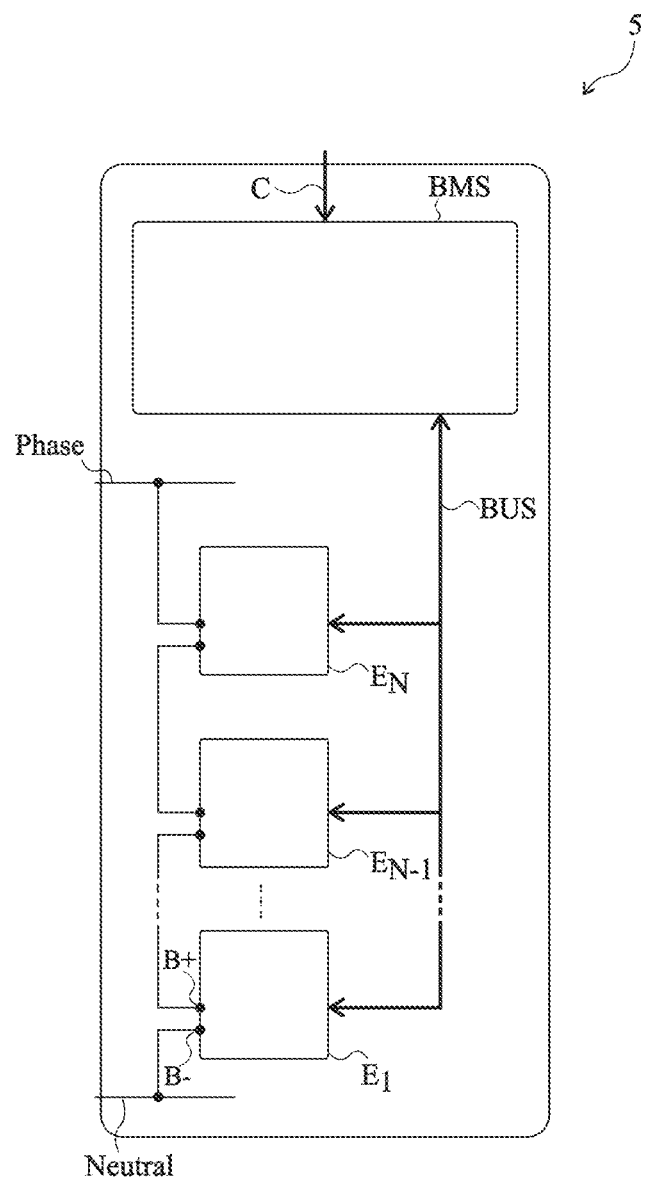
FIG. 1, previously described, partially and schematically shows an example of a cell battery.
Figure 2:
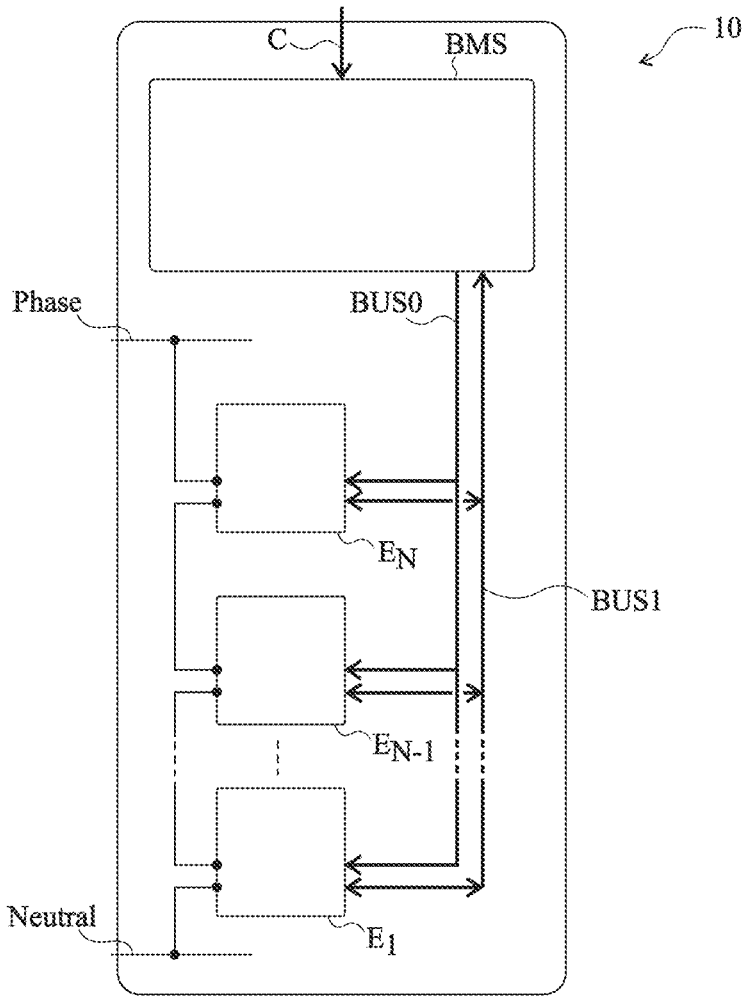
FIG. 2 partially and schematically shows an embodiment of a cell battery.

FIG. 2 shows an embodiment of a battery 10. Battery 10 comprises all the elements of the battery 5 shown in FIG. 1, with the difference that bus BUS is replaced with two buses BUS0 and BUS1, which each couple master control circuit BMS to each module $E_1$ to $E_N$.

Bus BUS0 is a fast bus, that is, a bus over which the data are transmitted at a rate greater than 3 megabits per second, preferably in the range from 5 megabits per second to 7 megabits per second. Bus BUS0 may be a unidirectional bus. As an example, bus BUS0 is a bus according to the RS485 standard.

Bus BUS1 is a slow bus, that is, a bus over which the data are transmitted at a rate smaller than 3 megabits per second, preferably in the range from 0.5 megabits per second to 1 megabit per second. Bus BUS1 is a unidirectional bus. As an example, bus BUS1 is a CAN data bus, particularly according to ISO standard 11898.

Fast bus BUS0 is used for the transmission of control signals supplied by master control circuit BMS to follow set point value C and possibly to follow a modification of the priority classification. According to an embodiment, the control signals correspond to orders of connection/disconnection of the cells of each module $E_1$ to $E_N$. According to another embodiment, the control signals correspond to a number of cells to be connected.

Slow bus BUS1 is used for the exchange of all the other data between master control circuit BMS and each module $E_1$ to $E_N$.

Master control circuit BMS may correspond to a dedicated circuit or may comprise a processor, for example, a microprocessor or a microcontroller, capable of executing instructions of a computer program stored in the memory.

Figure 3:
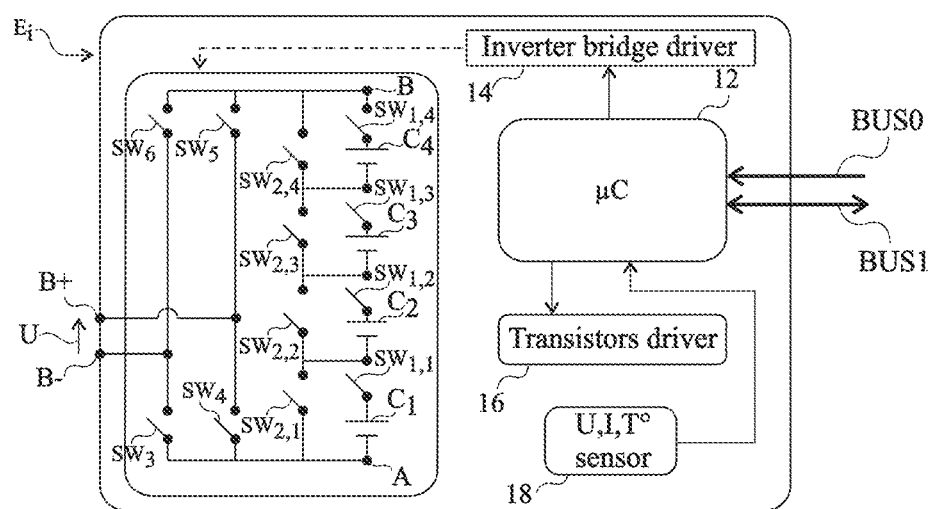
FIG. 3 partially and schematically shows an example of a module of the battery of FIG. 1.

FIG. 3 shows an embodiment of module $E_i$, where i varies from 1 to N, where each module $E_1$ to $E_N$ may have a similar structure.

According to the present embodiment, module $E_i$ is capable of delivering a voltage U between positive terminal B+ and negative terminal B−. Module $E_i$ comprises cells $C_1$ to $C_M$, where M is an integer in the range from 2 to 10, preferably from 2 to 5, four cells $C_1$, $C_2$, $C_3$, and $C_4$ being shown as an example in FIG. 3. Cells $C_1$ to $C_M$ are coupled together and to terminals B+ and B− by switches. In the present embodiment, for each cell $C_k$, k being an integer varying from 1 to M, module $E_i$ comprises a first switch $SW_{1,k}$ in series with cell $C_k$ and a second switch $SW_{2,k}$ in parallel with the assembly comprising cell $C_k$ and switch $SW_{1,k}$. The M assemblies comprising cell $C_k$ and first switch $SW_{1,k}$ are arranged in series between a node A and a node B. The control of switches $SW_{1,k}$ and $SW_{2,k}$, with k varying from 1 to M, enables to place in series between nodes A and B from 1 to M cells among the M cells $C_1$ to $C_M$. In the present embodiment, module $E_i$ further comprises an inverter bridge, also called H bridge, between nodes A and B and terminals B+ and B−, which enables to apply the voltage present between nodes A and B between terminals B+ and B− in both directions. According to an embodiment, the inverter bridge comprises a switch $SW_3$ coupling node A to terminal B+, a switch $SW_4$ coupling node A to terminal B−, a switch $SW_5$ coupling node B to terminal B+, and a switch $SW_6$ coupling node B to terminal B−. As an example, each switch $SW_{1,k}$ and $SW_{2,k}$, with k varying from 1 to M, $SW_3$, $SW_4$, $SW_5$, and $SW_6$ may correspond to an insulated-gate field effect transistor, also called MOS transistor, particularly a MOS power transistor, for example, an N-channel MOS transistor.

Each module $E_i$ further comprises slave control circuit 12 (µC), capable of exchanging and of receiving data transmitted by master control circuit BMS over bus BUS0 and of exchanging data with master control circuit BMS over bus BUS1. Slave control circuit 12 may correspond to a dedicated circuit or may comprise a processor, for example, a microprocessor or a microcontroller, capable of executing instructions of a computer program stored in the memory.

Each module $E_i$ further comprises a driver circuit 14 (Inverter bridge driver) coupled to switches $SW_3$, $SW_4$, $SW_5$, and $SW_6$ of the inverter bridge and a driver circuit 16 (Transistors driver) coupled to switches $SW_{1,k}$ and $SW_{2,k}$, with k varying from 1 to M. Each driver circuit 14, 16 is capable of converting the control signals delivered by slave control circuit 12 into signals capable of controlling the switches.

Each module $E_i$ further comprises sensors 18 (U, I, T° sensor) coupled to slave control circuit 12. Module $E_i$ may comprise, for each cell $C_k$, a temperature sensor capable of measuring the temperature of cell $C_k$. Module $E_i$ may further comprise, for each cell $C_k$, a voltage sensor capable of measuring the voltage across cell $C_k$. Module $E_i$ may further comprise, for each cell $C_k$, a current sensor capable of measuring the current delivered by cell $C_k$. The slave control circuit 12 of each module $E_i$ is capable of transmitting third data to master control circuit BMS over slow bus BUS1 representative of the measurements performed by the sensors 18 of module $E_i$. The number and the type of sensors particularly depend on the arrangement of the cells of module $E_i$. In the cell arrangement shown in FIG. 3, a single sensor of the current flowing at node A or at node B may be provided.

In the embodiment illustrated in FIG. 3, an order of connection of a cell $C_k$ of a module $E_i$ means that cell $C_k$ should be series-connected between the nodes A and B of module $E_i$, which is obtained by turning on switch $SW_{1,k}$ and by turning off switch $SW_{2,k}$, and an order of disconnection of a cell $C_k$ of a module $E_i$ means that cell $C_k$ should not be series-connected between the nodes A and B of module $E_i$, which is obtained by turning off switch $SW_{1,k}$ and by turning on $SW_{2,k}$. However, for a different arrangement of the cells $C_k$ of module $E_i$ where cells $C_k$ may be arranged in series or in parallel between nodes A and B, an order of connection of cells $C_k$ should further specify in which configuration, series or parallel, cell $C_k$ is placed with respect to the other cells of module $E_i$.

Master control circuit BMS is capable of determining the cell priority table. The priority table may be stored in a memory of master control circuit BMS in the form of a chained list or of a table. According to an embodiment, some of the control signals transmitted by master control circuit BMS to the slave control circuits 12 of modules $E_i$ over fast bus BUS0 may be representative of orders of connection/disconnection of the cells of modules $E_i$ to comply with the priority table. According to another embodiment, data transmitted by master control circuit BMS to slave control circuits 12 over slow bus BUS1 may be representative of the priority table or of a portion thereof.

The transmission of the control signals over fast bus BUS0 from master control circuit BMS to the slave control circuit 12 of each module $E_i$, with i varying from 1 to N, may be performed according to different transmission methods. The control signal transmission method implemented over fast bus BUS0 may be different from the data transmission method implemented over slow bus BUS1.

According to an embodiment, the control signals transmitted by master control circuit BMS to the slave control circuits 12 of modules $E_i$ are representative of orders of connection/disconnection of the cells $C_k$ of modules $E_i$. According to an embodiment, the delivered control signals are representative of orders of connection/disconnection of the cells $C_k$ of modules $E_i$ to follow set point value C. According to an embodiment, when master control circuit BMS determines these control signals, it may not take into account the priority table. In this case, additional control signals may be transmitted by master control circuit BMS to the slave control circuits 12 of the modules $E_i$ corresponding to orders of connection/disconnection of the cells $C_k$ of modules $E_i$ to take into account the priority table. Slave control circuits 12 then process as a priority the control signals to follow the set point and process in non-priority fashion the additional control signals to comply with the priority table. According to another embodiment, when master control circuit BMS determines the control signals to follow set point value C, it may take into account at least a portion of the priority table, particularly of the portion of the priority table concerning the cells to be connected.

According to an embodiment of the method of data transmission over bus BUS0 or BUS1, a control signal transmitted by master control circuit BMS is addressed to the slave control circuit 12 of a single module $E_i$. The slave control circuit 12 of each module is then capable of determining whether the control signal that it receives is addressed thereto. If this is true, slave control circuit 12 controls driver circuits 14 and 16 to apply the orders of connection/disconnection requested by master control circuit BMS. As an example, the control signals are transmitted in the form of frames, each frame comprising a header containing the address of the designated module $E_i$ followed by bytes relative to the control of the switches, and possibly followed by at least one control byte. An advantage of such an embodiment is that the reactivity of battery 5 on reception of a new set point C is optimal. Further, the switchings of the switches of modules $E_i$ are spread over time so that the generation of electromagnetic disturbances is decreased. Further, an efficient frame error control may be implemented.

According to another embodiment of the data transmission method, each frame transmitted by master control circuit BMS contains all the connection/disconnection orders for all the cells $C_k$ of all modules $E_i$. The slave control circuit 12 of each module $E_i$ is thus used for each frame sent by master control circuit BMS. The slave control circuit 12 of each module $E_i$ is capable of analyzing the frame by extracting the orders of connection/disconnection of the switches belonging to module $E_i$.

According to a data transmission method, the control signals transmitted by master control circuit BMS over fast bus BUS0 are not representative of orders of connection/disconnection of the cells $C_k$ of modules $E_i$ but are representative of the desired total number of cells in series between the terminals Phase and Neutral of battery 10. The slave control circuit 12 of each module $E_i$ is thus used for each sent frame. Master control circuit BMS determines the cell priority table and regularly transmits it to the slave control circuits 12 of modules $E_i$ over slow bus BUS1. In particular, an update of the priority table may be transmitted by master control circuit BMS to slave control circuits 12 for each modification of the priority table determined by master control circuit BMS. Data representative of the priority table may then be transmitted over slow bus BUS1. The slave control circuit 12 of each module $E_i$ has stored the table of priority of use of the cells of module $E_i$ with respect to the other cells of battery 10. The slave control circuit 12 of each module $E_i$ is capable of comparing the number of cells requested by master control circuit BMS with the priority of the cells which form module $E_i$. An advantage of such an embodiment is that the reactivity of battery 5 on reception of a new set point value C is optimal.

Specific embodiments of the present invention have been described. Various variants and modifications will occur to those skilled in the art. Although FIG. 3 shows an embodiment of arrangement of the cells and of the switches of a module $E_i$, it should be clear that the structure of each module $E_i$ may be different. In particular, the structure of each module $E_i$ may correspond to one of the structures described in patent application WO 2012/117110.

The invention claimed is:

1. An electric system comprising a first control circuit and a plurality of modules arranged in series between first and second terminals, each module comprising third and fourth terminals, at least one of the third and fourth terminals of each module being coupled to one of the third and fourth terminals of another module, each module comprising electric cells and switches coupling the cells together and to the third and fourth terminals of the module and a second circuit for controlling the switches, the electric system further comprising a first data transmission bus coupling the first control circuit to each second control circuit and a second data transmission bus coupling the first control circuit to each second control circuit, wherein the first control circuit is capable of transmitting first data to the second control circuits over the first bus at a first rate and is capable of transmitting second data to the second control circuits over the second bus at a second rate smaller than the first rate.

2. The electric system according to claim 1, wherein the first control circuit is capable of transmitting the first data to the second control circuits over the first bus at the first rate, which varies from 5 megabits per second to 7 megabits per second.

3. The electric system according to claim 1, wherein the first control circuit is capable of transmitting the second data to the second control circuits over the second bus at the second rate, which varies from 0.5 megabit per second to 1 megabit per second.

4. The electric system according to claim 1, wherein the first bus is unidirectional.

5. The electric system according to claim 1, wherein the second bus is bidirectional.

6. The electric system according to claim 1, wherein each second control circuit is capable of transmitting third data to the first control circuit over the second bus.

7. The electric system according to claim 1, wherein each module comprises at least one sensor coupled to the second control circuit.

8. The electric system according to claim 1, wherein the first control circuit receives a set point value, said set point value being at least one of a set point value for the delivery of a voltage between the first and second terminals, a set point value for the delivery of a current between the first and second terminals, and a set point value for the connection of a given number of electric cells between the first and second terminals and determines the first data based on the set point value, the second control circuit of each module receiving the first data and controlling the turning on or the turning off of the switches of the module based on the first data.

9. The electric system according to claim 8, wherein the first control circuit determines a table of priority of connection of the electric cells of the modules, the second transmitted data being representative of the priority table.

10. The electric system according to claim 9, wherein each second control circuit is capable of transmitting third data to the first control circuit over the second bus and wherein the connection priority table is determined by the first control circuit based on the third data.

* * * * *